UNITED STATES PATENT OFFICE.

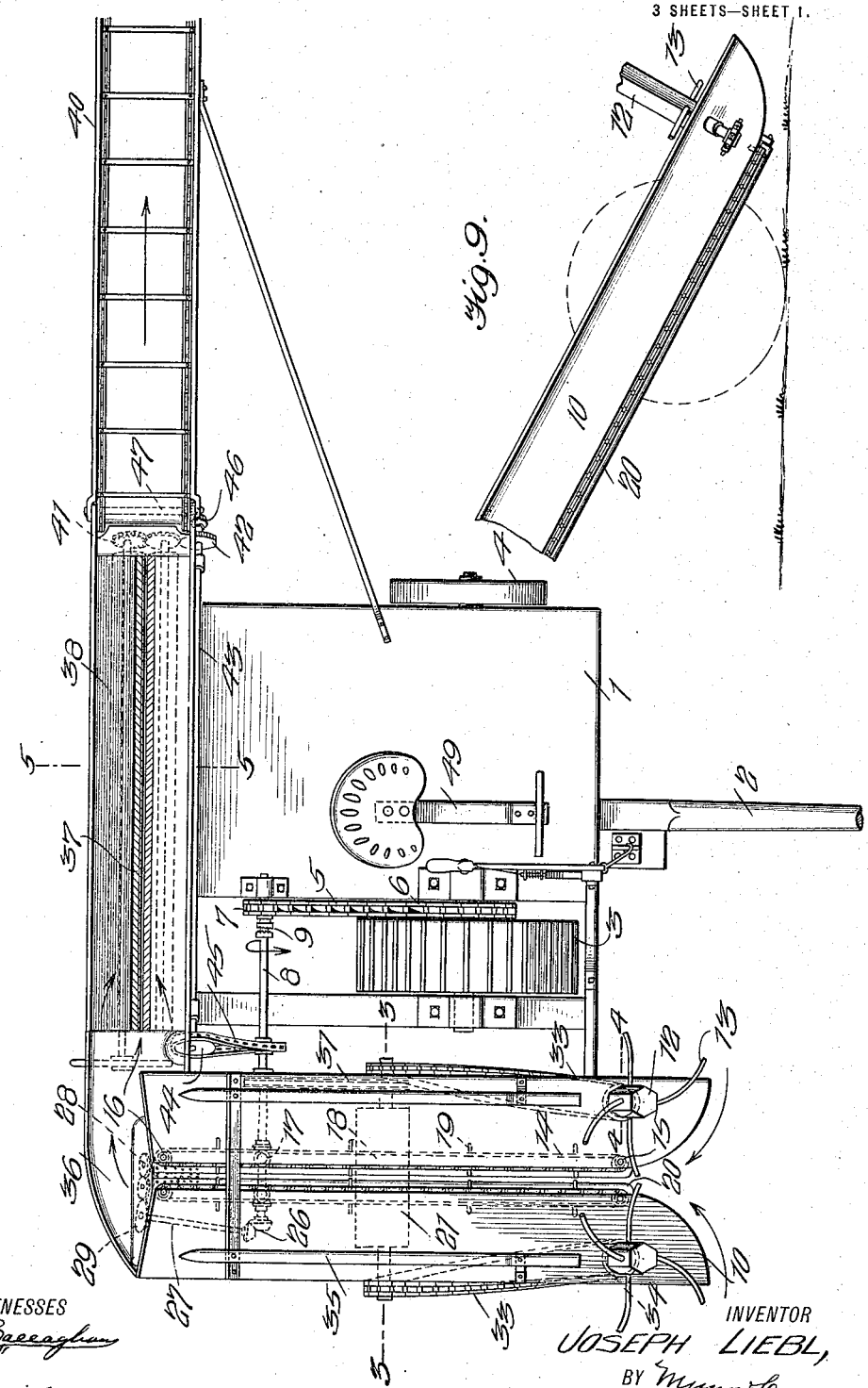

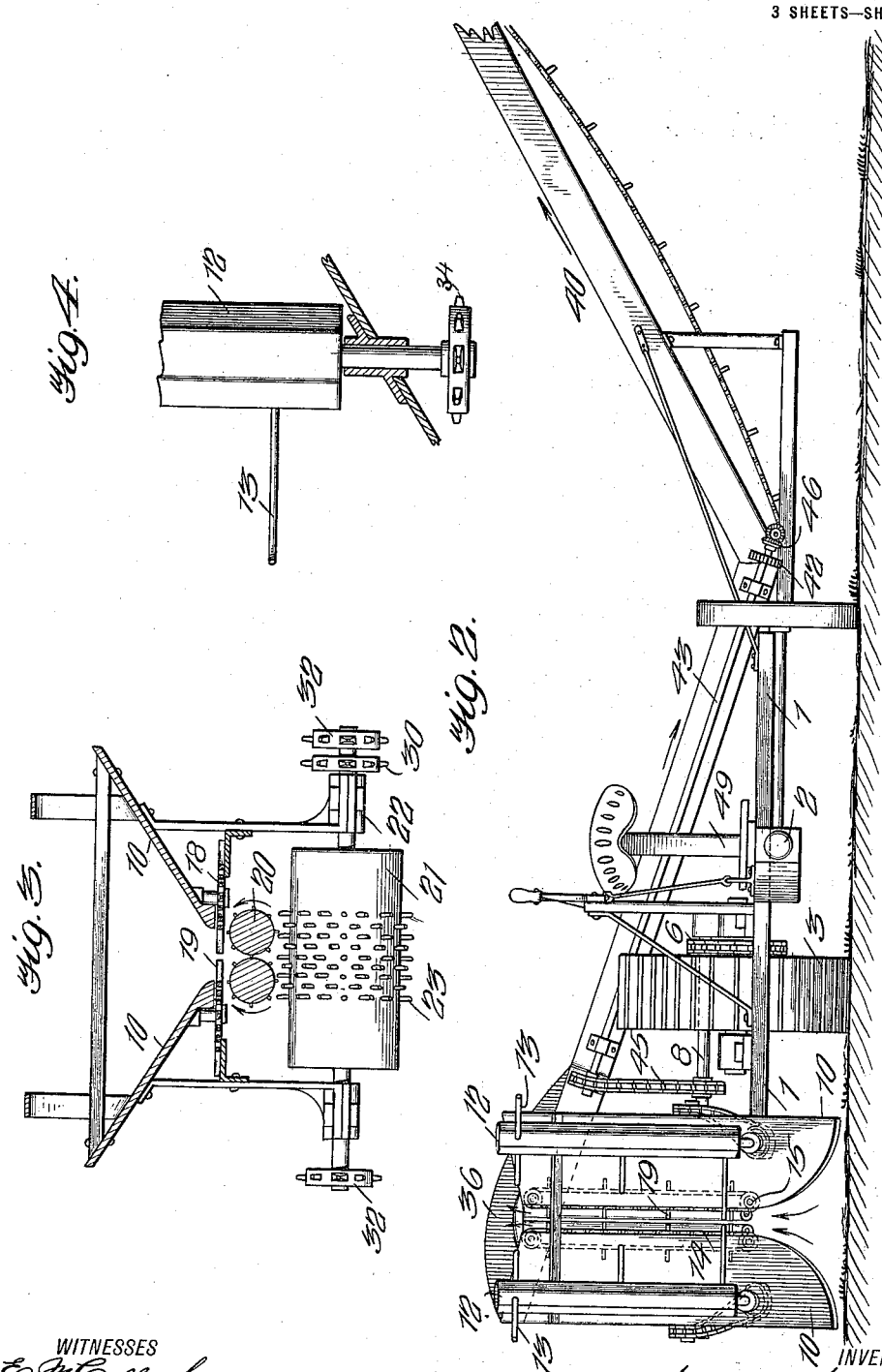
J. LIEBL.
CORN HARVESTER.
APPLICATION FILED DEC. 3, 1914.
1,155,827.
Patented Oct. 5, 1915.
3 SHEETS—SHEET 2.
INVENTOR
JOSEPH LIEBL,
BY
ATTORNEYS

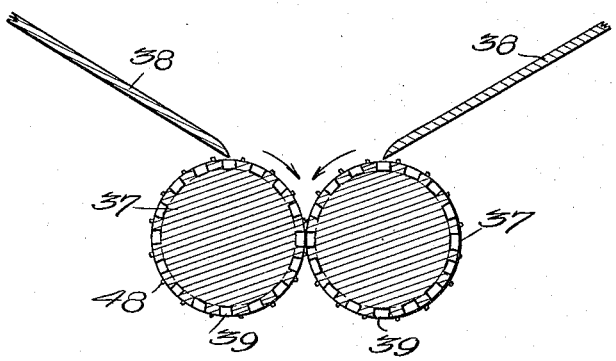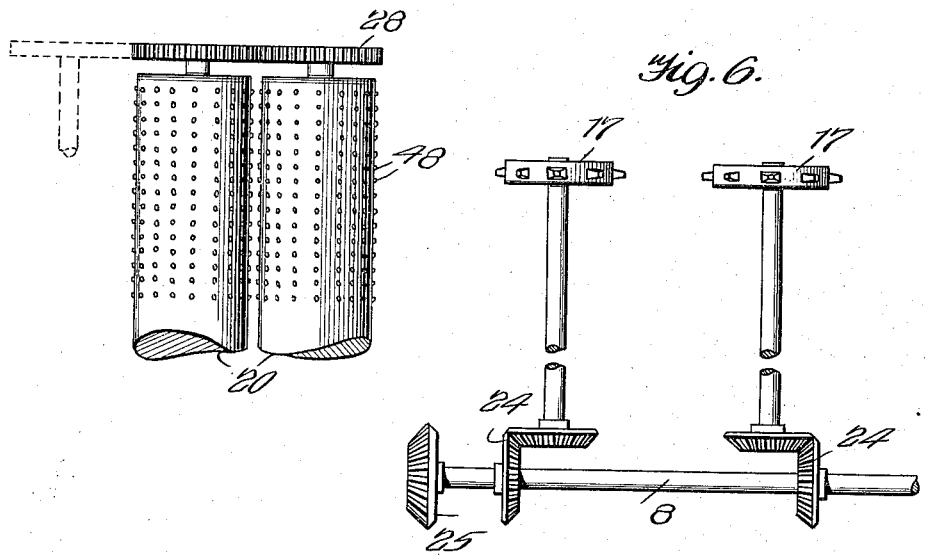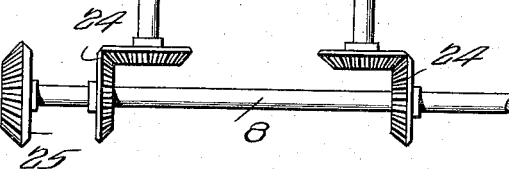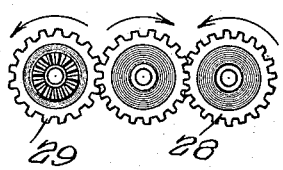

JOSEPH LIEBL, OF CLAYTON, SOUTH DAKOTA.

CORN-HARVESTER.

1,155,827.  Specification of Letters Patent.  Patented Oct. 5, 1915.

Application filed December 3, 1914. Serial No. 875,327.

*To all whom it may concern:*

Be it known that I, JOSEPH LIEBL, a citizen of the United States, and a resident of Clayton, in the county of Hutchinson and State of South Dakota, have made certain new and useful Improvements in Corn-Harvesters, of which the following is a specification.

My invention is a corn harvester adapted to automatically pull ears from their stalks and to deliver the same to rollers, by which they are husked.

A further object is to provide a beater projecting beneath and transversely across the snapping rollers and coacting therewith to prevent the same from becoming clogged.

A further object is to provide corn husking rollers with spiral grooves which in connection with outstanding pins successfully remove the husks from the corn in a quick and expeditious manner.

In the drawings accompanying this specification and forming a part thereof, the preferred embodiment of my invention is illustrated, in which:—

Figure 1 is a top plan view of the corn husker, Fig. 2 is a view in front elevation thereof, Fig. 3 is a sectional view taken on the line 3—3 of Fig. 1, Fig. 4 is a detail view of one of the revolving spindles which carry and direct the corn stalks to the conveying chains and snapping rollers, Fig. 5 is a detail view of the husking rollers representing the same in section, Fig. 6 is a detail view of the driving mechanism for the chain conveyers, Fig. 7 is a detail view in plan of the upper extremities of the snapping rollers, Fig. 8 is an end view of the snapping rollers illustrating the means whereby they are forcibly driven, and Fig. 9 is a fragmental view in side elevation of the lower extremities of the gathering boards and contiguous parts.

Referring to the drawings in which similar reference numerals designate corresponding parts throughout the several views, a frame 1 is provided with the tongue 2 extending therefrom whereby draft animals may be used in order to move the machine along the ground. The frame 1 is supported by the wheels 3 and 4, the former being provided with suitable means adapted to engage the ground and thus forcibly drive the chain 5 which is mounted upon a sprocket 6 carried by the wheel. The chain 5 extends around a sprocket wheel 7 which is mounted upon and arranged to drive the shaft 8 through the intervention of the clutch 9. Thus with the clutch in position the movement of the entire apparatus over the ground will result in the rotation of the shaft 8 and parts connected therewith.

Two gathering boards 10 having rounded front ends are spaced apart and slope inward toward each other, as illustrated in Fig. 3, and also slope downward toward the front end of the machine. These boards are secured to the frame 1, and are adapted to receive the corn stalks between them as the machine advances.

The revolving spindles 12 are located at the front extremities of the gathering boards and extend perpendicularly above the latter. They are provided with a plurality of wiping arms 13 which are adapted to engage the corn stalks and thrust them between the gathering boards and into contact with the parallel chain conveyers 14, two of which are provided, the same extending along the opposite or confronting edges of the gathering boards. The chain conveyers include the lower sprocket wheels 15, upper sprocket wheels 16, driving sprocket wheels 17 and the chains 18. The chains 18 are provided with lateral teeth or spurs 19 which are spaced apart and adapted to engage the corn ears and to move the same toward the upper delivering extremity of the gathering mechanism.

Mounted immediately below the chain conveyers are the snapping rollers 20 which revolve toward each other or in the directions indicated by the arrows in Fig. 3 and are adapted to forcibly pull the stalks from the corn ears with the result that the stalks will be forcibly discharged from the mechanism. In order to prevent the stalks from being carried to the upper extremity of the snapping rollers and clogging the same the beater 21 is provided, journaled in the bearings 22 and extends transversely below the snapping rollers. The beater includes a plurality of outstanding pins 23 which in revolving come in close proximity with the snapping rollers and are designed to engage the stalks and aid in their forcible ejection.

Coming now to the mechanism whereby the chain conveyers, stalk-feeding means 12, and snapping rollers are actuated it will be found by referring to Fig. 6 that motion is imparted to the sprocket wheels 17 from the shaft 8 by the beveled gears 24. The shaft 8 is provided with the beveled gear 25 at its extremity which meshes with and drives the beveled gear 26 carried upon the shaft 27. The snapping rollers carry the meshing gears 28 at their upper extremity which mesh with and are driven by the gear 29 carried upon the remote end of the shaft 27. Thus as the shaft 8 is forcibly rotated motion is imparted to the snapping rollers and chain-conveyers.

The beater 21 is provided with the sprocket wheel 30 over which extends the chain 31 leading from the shaft 8 thus forcibly driving the beater. The beater is provided with the oppositely disposed sprocket wheels 32 from which the chains 33 extend which latter pass around and engage the sprocket wheels 34 carried by the spindles 12. By such arrangement the beater and the gathering means whereby the stalks are carried to the conveyer chains, are actuated. A pair of rails 35 extend along the outer edges of the gathering boards and prevent the corn from becoming moved beyond the board and accidentally lost. The ears will thus be severed from the corn stalks, the former being delivered over the farther edges of the gathering boards into the chute 36 and the latter being ejected below the snapping rollers and deposited upon the ground.

A pair of husking rollers 37 are provided with the chute 38 which is open at its center and beneath which the husking rollers extend. The chute 38 is adapted to deliver the corn ears onto the husking rollers 37 the same including a plurality of spiral grooves 39 which are adapted to engage the husks of the corn and remove the same therefrom. The husking rollers as illustrated in Fig. 2, slope downwardly toward their lower extremities so that the ears will move gradually therealong and be delivered upon the elevator 40 disposed at the lower extremity of the husking mechanism. The husked ears will be carried upwardly on the elevator 40 which may deliver the husked ears into a wagon or receptacle as desired. The husking rollers are provided at their lower extremities with the gears 41 which mesh with a gear 42 carried by the shaft 43. The shaft 43 is provided at its remote extremity with the sprocket wheel 44 driven by the chain 45 which is mounted upon the shaft 8 and so driven. The shaft 43 is provided with a beveled gear 46 meshing with and driving the shaft 47 which constitutes the lower extremity of the elevator and thus provides for its actuation.

In order to facilitate the operation of both the snapping and husking rollers they are provided with the small pins 48 thus increasing the efficiency of the entire machine. A seat 49 is mounted upon the frame and serves to support an operator thereon within whose reach the clutch 9 is conveniently disposed. In the actual operation of the machine the same is dragged forwardly over the ground with the gathering boards encountering and directing corn stalks therebetween aided by the revolving spindles and wiping arms which latter constitute the gathering means. The corn-stalks with their ears are directed upon the gathering chains and moved upwardly thereby, the stalks being ejected during such movement and the ears being deposited in the chute 36 from which they are delivered to the husking rollers. The husking rollers are moved in their reverse directions and are adapted to husk the ears and deliver the corn in its husked condition to the elevating mechanism.

I claim:

The improved corn harvester comprising parallel gathering boards inclined toward each other and separated by a narrow space, chain conveyers extending along the lower edges of the boards snapping rollers disposed below said conveyers and arranged parallel to the same, and means for driving the same whereby they are adapted to forcibly separate the ears from the stalks, and a toothed beater disposed below and extending transversely of the conveyer, as described.

JOSEPH LIEBL.

Witnesses:
H. A. RADEMACHER,
LEE BROWN.

Copies of this patent may be obtained for five cents each, by addressing the "Commissioner of Patents, Washington, D. C."